Patented Jan. 15, 1935

1,987,825

UNITED STATES PATENT OFFICE 1,987,825

PROCESS OF TREATING FOOD PRODUCTS

Oswald H. Hansen, Cedarburg, Wis.

No Drawing. Application April 27, 1932,
Serial No. 607,900

8 Claims. (Cl. 99—8)

The present invention relates in general to new and useful improvements in the art of treating edible substances in order to preserve the same, and relates more specifically to an improved process of treating food products preparatory to final sealing thereof in receptacles wherein the products are packed for subsequent transportation, handling and marketing.

Generally defined, an object of the present invention is to provide an improved process of cooling food products after heat treatment thereof, in a manner which will prevent objectionable change in the natural characteristics of the commodity.

While numerous methods of heat treating various kinds of edible substances or food products in order to destroy objectionable bacteria have heretofore been proposed, it has been found that the most effective of these prior sterilization processes also tended to destroy the natural characteristics of the materials treated. It is not only important in the treatment of food products in order to prepare the same for subsequent merchandising, that they be effectively sterilized, but it is equally important that the commodities be maintained in natural condition especialy as to flavor, color and general appearance. Regardless of the effectiveness of the sterilization process, ineffective cooling following such sterilization tends to deteriorate many food commodities by destroying one or more of the natural characteristics, and thereby reduces the salability of the product. This is especially true of certain commodities, which when subjected to sterilization at high temperature and pressure, and to subsequent cooling by the old method after the sterilized product has been sealed in the final containers, will lose their natural flavor and color to such a degree that the purchasing public will not accept the canned product in substitution for fresh commodity.

It is a more specific object of the present invention to provide an improved method of treating food products such as milk, vegetables, fruits or the like, so as to not only preserve the same, but to also retain the natural flavor and appearance of the product.

Another specific object of the invention is to provide a new and useful process of cooling heat treated substances by evaporation of fluid disposed in contact with the substance after the heating operation has been completed.

Still another specific object of the invention is to provide a method of quickly cooling material which has been heated while subjected to pressure, by relieving the pressure and thus effectively cooling the commodity due to evaporation of the liquid.

A further specific object of the invention is to provide an improved treating process whereby edible substances may be rendered sterile by direct contact with a liquid heating medium, and wherein rapid and effective cooling is secured by evaporation of some or all of the liquid immediately after sterilization has been attained.

Another specific object of the invention is to provide an improved process of cooling commodities which have been previously heat treated in accordance with the process forming the subject of Patent No. 1,857,450, granted May 10, 1932.

Still another specific object of the invention is to provide a heat treating process for foods, which is adapted to effectively treat the commodities for either wet or dry packing thereof, and which eliminates necessity of providing mechanical means for producing a dry vacuum pack.

A further specific object of the invention is to provide an improved method of heat treating relatively delicate comestible substances without deteriorating or producing matting thereof.

Another specific object of the invention is to provide an improved process of cooling heat treated food products prior to final packing thereof in sealed containers, and under sterile conditions.

Still another object of the invention is to provide a simple and highly effective food treating process which can be quickly, automatically and effectively commercially exploited with compact apparatus.

These and other objects and advantages of the invention will be apparent from the following detailed description of several specific adaptations of the improved process to the treatment of food of different kinds.

The invention consists primarily in the utilization of the cooling effect produced by evaporation of liquid such as water or brine, to reduce the temperature of heated substances, and may be applied to the treatment of material either before or after batches thereof have been placed in the final containers. The improvement is especially applicable for the purpose of effectively cooling commodities which have been sterilized by direct exposure thereof to a liquid heating medium, and while subjected to pressure sufficient to prevent conversion of the liquid into steam. While the liquid heating medium specifically will be referred to herein as water, other liquids such as syrup or brine may be utilized as a substitute for pure water.

It is an established fact, that food products can be most effectively sterilized by direct exposure of the particles thereof to a heating medium, because the heat penetration is far more rapid when the particles of the substance being treated are subjected to direct contact with the medium, than if the medium is applied only to the exterior of a relatively large mass of the material. It is also a fact that treatment of such substances under pressure, will permit utilization of a heating medium such as water at higher temperature and with less destructive effect upon the particles of the substance, than when the material is treated under atmospheric pressure with a highly heated medium such as steam.

In accordance with one embodiment of the present invention, assuming it to be desirable to produce a so-called dry or vacuum pack, successive batches of the commodity are introduced into a sealed chamber and are subjected to high pressure either before or after a liquid heating medium such as water at high temperature, is brought into direct contact with all portions of the batch, to thus produce rapid and effective sterilization. The pressure is subsequently gradually but rapidly reduced and the particles of material absorb heat units from the medium. After complete sterilization has been effected, the pressure upon the material is still further gradually reduced so as to permit evaporation of a predetermined portion of the heating liquid. This evaporation is caused primarily by the reduction in pressure, but is also augmented by the heat within the material, and may be continued until either a predetermined portion or all of the liquid has been evaporated from the batch of commodity. The commodity thus partially cooled may then be placed in its final container and the container sealed whereupon further final cooling may be effected. Depending upon the moisture retained within the charge of material prior to sealing of the container, a substantially complete or partial vacuum will be produced within the finally sealed container upon final cooling thereof. The production of the vacuous condition within the sealed containers, also tends to further cool the confined product due to the condensation of the likewise confined vapors under sub-atmospheric pressure. It will be apparent that the commodity may be heat treated and cooled either before or after being placed in the container, and that the commodity should not be exposed to unsterile conditions after sterilization thereof and prior to final sealing. The final cooling of the sealed containers may be effected either by exposure of the containers to the atmosphere, or by subjecting the same to a cooling medium such as cold water or air.

When it is desired to produce a so-called wet pack, successive batches of the commodity may again be introduced into a sealed chamber and subjected to high pressure and temperature while liquid heating medium is brought into direct contact with all portions thereof, to produce rapid and effective sterilization. The pressure may then be gradually but rapidly reduced as previously explained so as to permit evaporation of a predetermined portion of the heating liquid. In this case, the evaporation may be carried to such an extent that either all or only a portion of the heating liquid is removed. If all of the heating medium is evaporated, each batch of heat treated material may be supplied with a desired quantity of sterile liquid prior to final packing thereof in the containers. If only a portion of the heating liquid is removed by evaporation, the remaining portion may be sufficient to produce the final mixture desired, or additional sterile liquid may be placed into each batch prior to final sealing thereof. The evaporation of the heating liquid tends to partially cool the commodity prior to final sealing, and the final cooling of the sealed containers may be effected either by exposure of the containers to the atmosphere, or by subjecting the same to a cooling medium such as cold water or air. It will be apparent that this method of producing a wet pack, may likewise be practiced upon the commodity either before or after the same is placed in the containers, and that the commodity should not be exposed to unsterile conditions after the sterilization step has been completed and prior to final packing.

From the foregoing description, it will be apparent that the same sterilization may be used for either vacuum or wet packing, and that the necessity of providing mechanical vacuum producing machinery is entirely eliminated. The product is initially sterilized, then separated from the liquid and initially cooled, and finally packed in the containers and further cooled to create a vacuum by condensation of the confined vapors. The degree of vacuum is determined by the temperature of the material at the time of confinement thereof, and by the quantity of liquid remaining in each batch at such time. The evaporation of the heating liquid prior to sealing, not only rapidly and effectively cools the product, but also preserves the organic salts, the natural color, the flavoring and other characteristics of the commodity, making it impossible to distinguish the finally treated commodity from similar product in its fresh state. By utilizing flash sterilization and subsequent cooling, certain products can be sterilized and retained sufficiently firm to prevent matting in cans such as results from prior methods, and by utilizing brine as a sterilizing liquid, the uneven distribution of salt in vacuum packed product will be avoided.

It will be apparent that the improved process of cooling food products after heat treatment thereof, will effectively prevent objectionable change in the natural characteristics of the commodity, and the effectiveness of this process has been thoroughly demonstrated by the production of heat treated food products which cannot be distinguished from the original commodity.

It should be understood that it is not desired to limit the invention to the precise steps of the process herein described by way of illustration, for various modifications within the scope of the claims may occur to persons skilled in the art.

It is claimed and desired to secure by Letters Patent:

1. The process of treating food products, which comprises, causing a food product to contact with liquid heated to a temperature sufficiently high to sterilize the product while subjected to pressure sufficient to prevent boiling of the liquid, and subsequently releasing the pressure sufficiently to cool the product by evaporation of a quantity of the liquid.

2. The process of treating food products, which comprises, causing a food product to contact with liquid heated to a temperature sufficiently high to sterilize the product while subjected to pressure sufficient to prevent boiling of the liquid, and subsequently gradually releasing the pressure for a definite period of time sufficient to evaporate a predetermined quantity of the liquid.

3. The process of treating food products, which comprises, causing a food product to contact with liquid heated to a temperature sufficiently high to sterilize the product while subjected to pressure sufficient to prevent boiling of the liquid, releasing the pressure sufficiently to cool the product by evaporation of a quantity of the liquid, and subsequently sealing the product in a container.

4. The process of treating food products, which comprises, filling the voids of successive batches of food product with liquid heated to a temperature sufficiently high to sterilize the product while subjected to pressure sufficient to prevent boiling of the liquid, gradually releasing the pressure on the successive batches sufficiently to evaporate a quantity of the liquid, and finally sealing the successive batches of product in containers.

5. The process of treating food products, which comprises, causing successive batches of a food product to contact with liquid containing sufficient heat units to sterilize the product while subjected to pressure sufficient to prevent boiling of the liquid, and subsequently releasing the pressure sufficiently to cool the successive batches by evaporation of a quantity of the liquid.

6. The process of treating food products, which comprises, causing successive batches of a food product to contact with liquid containing sufficient heat units to sterilize the product while subjected to pressure sufficient to prevent boiling of the liquid, subsequently releasing the pressure sufficiently to cool the product by evaporation of a quantity of the liquid, and finally sealing the sterile batches in containers.

7. The process of treating food products, which comprises, heating successive batches of a food product in direct contact with liquid to a temperature sufficiently high to sterilize the product while subjected to pressure sufficient to prevent boiling of said liquid, subsequently releasing the pressure sufficiently to cool the product by evaporation of a quantity of said liquid while still maintaining the pressure sufficiently high to prevent boiling of the remaining liquid, and finally sealing the cooled sterile batches in containers.

8. The process of treating food products, which comprises, heating successive batches of a food product in direct contact with liquid to a temperature sufficiently high to sterilize the product while subjected to pressure sufficient to prevent boiling of said liquid, subsequently gradually releasing the pressure for a definite period of time sufficient to evaporate a predetermined quantity of the liquid but not sufficient to permit boiling of the remaining liquid, and finally sealing the cooled sterile batches in containers.

OSWALD H. HANSEN.